(12) United States Patent
Zielinski et al.

(10) Patent No.: US 12,480,924 B2
(45) Date of Patent: Nov. 25, 2025

(54) AUTOMATED RECORD QUALITY DETERMINATION AND PROCESSING FOR POLLUTANT EMISSION QUANTIFICATION

(71) Applicant: SCHLUMBERGER TECHNOLOGY CORPORATION, Sugar Land, TX (US)

(72) Inventors: Lukasz Zielinski, Arlington, MA (US); Kashif Rashid, Wayland, MA (US); Junyi Yuan, Boston, MA (US); Andrew J. Speck, Milton, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/993,408

(22) PCT Filed: Aug. 3, 2023

(86) PCT No.: PCT/US2023/029363
§ 371 (c)(1),
(2) Date: Jan. 10, 2025

(87) PCT Pub. No.: WO2024/030525
PCT Pub. Date: Feb. 8, 2024

(65) Prior Publication Data
US 2025/0264448 A1 Aug. 21, 2025

Related U.S. Application Data

(60) Provisional application No. 63/370,270, filed on Aug. 3, 2022.

(51) Int. Cl.
*G01N 33/00* (2006.01)
(52) U.S. Cl.
CPC .............................. *G01N 33/0063* (2013.01)

(58) Field of Classification Search
CPC ...... G06Q 50/26; G01W 1/06; G01N 33/0047; G01N 33/063; G01N 33/0068
(Continued)

(56) References Cited

U.S. PATENT DOCUMENTS 11,525,764 B2   12/2022   Bryning
11,630,022 B2   4/2023    Hedberg
(Continued)

FOREIGN PATENT DOCUMENTS

CN   109614526 A   4/2019
CN   109195132 B   9/2021
(Continued)

OTHER PUBLICATIONS

Ouyang et al., Cn 107608009A, "An Atmosphere Quality Monitoring Device, Processing Terminal and Server", Date Published: Jan. 19, 2018 (Year: 2018).*
(Continued)

*Primary Examiner* — John H Le
(74) *Attorney, Agent, or Firm* — Jeffrey D. Frantz (57) ABSTRACT

Embodiments presented provide for a method of evaluation for data that is inconsistent or that changes over time. These embodiments involve the processing of pollutants in a stream such that accuracy is maintained during the processing for high quality evaluation. The method includes collecting atmospheric data for an area, collecting concentration data for pollutant emissions, processing the atmospheric data to determine a quality of the atmospheric data, processing the concentration data for pollutant emissions to determine a concentration data quality, producing a combined quality metric from the processed atmospheric data and the processed concentration data, and determining if the combined quality metric is of a high or low level.

13 Claims, 4 Drawing Sheets

(58) Field of Classification Search
USPC .......................................................... 702/81
See application file for complete search history.

(56) References Cited

U.S. PATENT DOCUMENTS

| | | |
|---|---|---|
| 2014/0067919 A1 | 3/2014 | Tada |
| 2015/0103178 A1 | 4/2015 | Itoh |
| 2015/0172545 A1 | 6/2015 | Szabo |
| 2015/0213697 A1 | 7/2015 | Knox |
| 2015/0369730 A1 | 12/2015 | Schmidt |
| 2016/0146696 A1 | 5/2016 | Steele |
| 2017/0024642 A1 | 1/2017 | Xiong |
| 2017/0364818 A1 | 12/2017 | Wu |
| 2018/0039885 A1 | 2/2018 | Albrecht |
| 2018/0292286 A1 | 10/2018 | Dittberner |
| 2018/0365522 A1 | 12/2018 | Jiang |
| 2019/0068879 A1 | 2/2019 | Bao |
| 2019/0196892 A1 | 6/2019 | Matei |
| 2019/0285504 A1 | 9/2019 | Muralidhar |
| 2019/0285600 A1 | 9/2019 | Klein |
| 2019/0302013 A1 | 10/2019 | Wang |
| 2020/0011789 A1 | 1/2020 | Sandsten |
| 2020/0176088 A1 | 6/2020 | Kanamarlapudi |
| 2020/0182779 A1 | 6/2020 | Kasten |
| 2020/0226426 A1 | 7/2020 | Jarquin Arroyo |
| 2020/0393434 A1 | 12/2020 | Li et al. |
| 2020/0398959 A1 | 12/2020 | Pomerantz |
| 2021/0140934 A1 | 5/2021 | Smith |
| 2021/0156793 A1 | 5/2021 | Leen |
| 2021/0255157 A1 | 8/2021 | Zhang |
| 2022/0091026 A1* | 3/2022 | Scott .................... G01P 13/045 |
| 2022/0244127 A1 | 8/2022 | Aubrey |
| 2022/0327708 A1 | 10/2022 | Satish |
| 2023/0111401 A1 | 4/2023 | Machover |
| 2023/0175914 A1 | 6/2023 | Diven |
| 2023/0177726 A1 | 6/2023 | Spears |
| 2023/0194483 A1 | 6/2023 | Some |
| 2023/0222271 A1 | 7/2023 | Spackova |
| 2023/0324430 A1 | 10/2023 | Reed |
| 2023/0326201 A1 | 10/2023 | Rashid |
| 2024/0200991 A1 | 6/2024 | Salman |
| 2024/0418693 A1 | 12/2024 | Rashid |
| 2024/0420311 A1 | 12/2024 | Speck |
| 2025/0067858 A1 | 2/2025 | Boucher |
| 2025/0078240 A1 | 3/2025 | Zielinski |

FOREIGN PATENT DOCUMENTS

| | | |
|---|---|---|
| CN | 113887044 A | 1/2022 |
| CN | 114329245 A | 4/2022 |
| CN | 114416692 A | 4/2022 |
| CN | 115018327 A | 9/2022 |
| CN | 115187767 A | 10/2022 |
| EP | 0943085 B1 | 3/2004 |
| JP | H06294500 A | 10/1994 |
| JP | H07083786 A | 10/1994 |
| JP | H07140031 A | 6/1995 |
| JP | H07190879 A | 7/1995 |
| JP | H07198523 A | 8/1995 |
| JP | 2996349 B2 | 12/1999 |
| KR | 101473956 B1 | 12/2014 |
| KR | 2015003470 A | 1/2015 |
| KR | 1020160123467 A | 10/2016 |
| KR | 20180041828 A | 4/2018 |
| KR | 1020190058230 A | 5/2019 |
| KR | 102482129 B1 | 1/2023 |
| WO | 2019213280 A1 | 11/2019 |
| WO | 2020018867 A1 | 1/2020 |
| WO | 2020206008 A1 | 10/2020 |
| WO | 2020263693 A1 | 12/2020 |
| WO | 2021067844 A1 | 4/2021 |
| WO | 2021156864 A1 | 8/2021 |
| WO | 2022023226 A1 | 2/2022 |
| WO | 2022051572 A1 | 3/2022 |
| WO | 2022056152 A1 | 3/2022 |
| WO | 2022081717 A1 | 4/2022 |
| WO | 2023133345 A1 | 7/2023 |
| WO | 2024030523 A1 | 2/2024 |
| WO | 2024030525 A1 | 2/2024 |
| WO | 2024054640 A1 | 3/2024 |
| WO | 2024064113 A1 | 3/2024 |
| WO | 2024155857 A1 | 7/2024 |
| WO | 2024254521 A1 | 12/2024 |

OTHER PUBLICATIONS

Titchener et al. "Single photon Lidar gas imagers for practical and widespread continuous methane monitoring." Applied Energy 306 (2022): 118086. (11 pages).
Saunois, M., et al. (2020), The Global Methane Budget 2000-2017, Earth Syst. Sci. Data, 12, 1561-1623.
Pomerantz A.E. et al., 2022. Present global warming: a justifiable and stable metric for evaluating short-lived climate pollutants. Environmental Research Letters, 17(11), p. 114052. (6 pages).
Cusworth , D.H. et al., 2021. Intermittency of large methane emitters in the Permian Basin. Environmental Science Technology Letters, 8(7), pp. 567-573.
Chakrabarti et al., Sep. 2022, Rapid Detection of Super-Emitters Utilizing an IoT-Enabled Continuous Methane Emissions Monitoring System. In SPE Annual Technical Conference and Exhibition. OnePetro. (6 pages).
Chakrabarti et al., Oct. 2022, Rapid Detection of Methane Super-Emitters Through Advanced Interpretation. In ADIPEC. OnePetro (6 pages).
Potyrailo, R.A. et al., 2020. Extraordinary performance of semiconducting metal oxide gas sensors using dielectric excitation. Nature Electronics, 3(5), pp. 280-289.
Zimmerle, D. Metec Controlled Test Protocol: Continuous Monitoring Emission Detection and Quantification, Energy Institute, Colorado State University. https://energy.colostate.edu/wp-content/uploads/sites/28/2021/03/Continuous-Monitoring-Protocol-R1.0.pdf (31 pages).
Take control of your emissions management programme, downloaded on Dec. 15, 2023 from link https://sensorup.com/methane-emissions-management/ (12 pages).
BlueSky resources makes sense out of sensors, downloaded on Dec. 15, 2023 from linke https://blueskyresources.com/solutions/ (3 pages).
Yu, L. et al., "Methane leakage source location based on a near-infrared off-axis integrated cavity output spectroscopic ppbv-level sensor and an optimized inverse model", Infrared Physics Technology, 2022, vol. 121, pp. 1-9.
Weidmann, D. et al., "Locating and Quanitifying Methane Emissions by Inverse Analysis of Path-Integrated Concentation Data Using a Markov-Chain Monte Carlo Apporach", ACS Earth and Space Chemistry, 2022, 6(9), pp. 2190-2198.
Ye, W. et al., "Leakage source location based on Gaussain plume diffusion model using a near-infrared sensor", Infrared Physics Technology, 2020, vol. 109, pp. 1-5.
Majumder et al., "Development and Evaluation of Ensemble Learning-based Environmental Methane Detection and Intensity Prediction Models", Dec. 17, 2023, pp. 1-16 (Year: 2023).
Andrews et al., "Quantitative Mapping of Methane Emissions in Oil Gas Facilities", Oct. 16-18, 2023, Society of Petroleum engineers, SPE-214909-MS, pp. 1-10 (Year: 2023).
Imbiriba et al., "Augmented physics-based machine learning for navigation and tracking", 2023, IEEE Transactions on Aerospace and electronic Systems, pp. 1-13 (Year: 2023).
S. R. Hanna, G. A. Briggs, R. P. Hosker, 1982, Handbook on Atmospheric Diffusion, DOE/TIC-11223 (7 pages).
"AERMOD" downloaded from Wikipedia on Jul. 31, 2024 from [https://en.wikipedia.org/wiki/AERMOD], Last Edited Mar. 4, 2022, 2 pages.
Search Report issued in Norwegian Patent Application No. 20230720 on Jan. 23, 2024; 10 pages.
Combined Search and Exam Report issued in United Kingdom patent Application No. GB2409015.1 dated Oct. 8, 2024, 5 pages.
Examination Report issued in Norwegian Patent Application No. 20230720 issued on Dec. 19, 2024, 1 page.

(56) References Cited

OTHER PUBLICATIONS

Office Action issued in U.S. Appl. No. 18/480,279 dated Nov. 7, 2023, 13 pages.
Notice of Allowance issued in U.S. Appl. No. 18/480,279 dated Nov. 8, 2024, 26 pages.
Extended Search Report issued in European Patent Application No. 24182656.9 dated Nov. 14, 2024, 6 pages.
International Search Report and Written Opinion issued in the PCT Application No. PCT/US2024/033102 dated Sep. 24, 2024, 10 pages.
Office Action issued in U.S. Appl. No. 18/537,978 dated Mar. 7, 2024, 10 pages.
International Search Report and Written Opinion issued in PCT Application PCT/US2023/083724, dated Apr. 30, 2024 (9 pages).
Notice of Allowance issued in U.S. Appl. No. 18/537,978 dated Aug. 19, 2024, 10 pages.
Notice of Allowance issued in U.S. Appl. No. 18/537,978 dated Jan. 27, 2025, 16 pages.
Extended Search Report issued in United Kingdom Patent Application No. GB2412830.8 dated Jan. 29, 2025, 7 pages.
International Search Report and Written Opinion issued in PCT Application PCT/US2023/033106, dated Jan. 23, 2024 (7 pages).
International Search Report and Written Opinion issued in the PCT Application No. PCT/US2023/029361 dated Nov. 14, 2023, 11 pages.
International Preliminary Report on Patentability issued in the PCT Application No. PCT/US2023/029361 dated Feb. 13, 2025, 7 pages.
International Preliminary Report on Patentability issued in the PCT Application No. PCT/US2023/029363 dated Feb. 13, 2025, 6 pages.
International Search Report and Written Opinion issued in the PCT Application No. PCT/US2024/012087 dated May 23, 2024, 11 pages.
International Search Report and Written Opinion issued in PCT Application PCT/US2023/010475, dated May 2, 2023 (11 pages).
International Preliminary Report on Patentability issued in the PCT Application No. PCT/US2023/010475 dated Jul. 25, 2024, 8 pages.
International Search Report and Written Opinion issued in PCT Application PCT/US2023/032307, dated Dec. 26, 2023 (10 pages).
International Search Report and Written Opinion of International Patent application No. PCT/US2023/029363 dated on Nov. 21, 2023, 10 pages.

\* cited by examiner

AUTOMATED RECORD QUALITY DETERMINATION AND PROCESSING FOR POLLUTANT EMISSION QUANTIFICATION

CROSS-REFERENCE TO RELATED APPLICATIONS

The present patent application is the National Stage Entry of International Application No. PCT/US2023/029363, filed Aug. 3, 2023, which claims priority to U.S. Provisional Patent Application No. 63/370,270, filed Aug. 3, 2022, which is herein incorporated by reference in its entirety.

FIELD OF THE DISCLOSURE

Aspects of the disclosure relate to pollutant monitoring. More specifically, aspects of the disclosure relate to methods and algorithms for automated determination of the quality of the data records acquired by sensors monitoring potential airborne pollutant emission events.

BACKGROUND

Monitoring of pollutant dispersion is an element of emissions control strategies created and enforced by various regulatory agencies in different countries. Typical methods for monitoring airborne pollutants involve placing a sensor sensitive to the substance of interest downwind of the emission source, which could be either mounted on a mobile carrier of some type or form part of a permanent installation. That sensor then measures the concentration of the given pollutant in the atmosphere at the particular point in space and time where it is located during the measurement.

A model of pollutant dispersion in the atmosphere is then necessary to link the measured concentration to the total emission amount or emission rate, along with the anticipated leak source location given the data collected. The most commonly used model is the Gaussian plume model (GPM) which provides the steady-state distribution of pollutant concentration in space for given atmospheric conditions, e.g., wind speed and direction and the atmospheric stability class. An advanced version of the GPM implemented in the AERMOD has been adapted by the United States Environmental Protection Agency as their preferred regulatory model for pollutant dispersion modeling.

The GPM, as a steady-state model, requires that certain atmospheric conditions persist in time in order for the equilibrium to develop. Thus, the wind direction and wind speed, as well as the atmospheric stability class set by the relative amplitude of the turbulent eddies to the mean wind speed, must all remain steady over an extended time period in order for the plume to follow the average concentration distribution predicted by the GPM. 'Steady' is not defined precisely, but rather follows loose rules of thumb such as, for instance, the wind direction varying by less than so many degrees. Another important characteristic of the GPM is that it is valid only in the average sense. Thus, even for the ideal steady-state conditions, the GPM will not predict the instantaneous concentration at a given point but only the mean concentration at that point as the instantaneous plume meanders around and through it. How long that averaging period must be to guarantee agreement with the GPM depends on the details of the spectrum of turbulent eddies, but typically is much shorter than the time scale necessary to establish the equilibrium conditions. Lastly, not all equilibrium conditions are equally favorable for successful pollutant source term estimation (STE). For example, very light wind conditions might persist for a long time and thus the convective boundary layer may be in equilibrium, but the pollutant will disperse rapidly, and either fall-out or rise high-up depending on its buoyancy, without being transported towards the sensor. Thus, in addition to the conditions for equilibrium development, there are independent conditions on the values of the current atmospheric parameters.

An independent, though partially overlapping, set of conditions comes from the assessment of the quality of the detected concentration signal itself. Clearly, the performance of the sensor plays a major role here, its sensitivity and detection threshold, and whether it is turned on and is operating properly. Questions then arise as to the accuracy of what is happening. Is the sensor intercepting the plume at all? Is the sensor closer to the plume center or near the edge? Is the signal strong and clearly above background level? Is it spikey and intermittent, or persistent? All these issues will determine the quality of the data and its usability for the STE process.

An expert in the field is aware of all these issues, related to both atmospheric conditions and to the concentration measurement quality, and should be able to make informed case-by-case decisions on which records to select for further processing and which to reject. The result, however, is a largely subjective selection. Different experts would likely agree on the extreme cases, i.e., really high quality and really poor quality, but they might reach different conclusions on intermediate cases which can predominate in a continuous monitoring setup. A rigorous systematic workflow for normalizing and automating this decision process is currently lacking.

There is a need to provide a method for evaluation of record quality determination that is more consistent than current conventional methods.

There is a further need to provide methods that do not have the drawbacks discussed above, namely arbitrary and inaccurate determination.

There is a still further need to reduce economic costs associated with evaluation operations described above while providing a consistent evaluative process.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method for automated record quality determination for pollutant emissions is disclosed. The method may comprise collecting atmospheric data for an area and collecting concentration data for pollutant emissions. The method may also comprise processing the atmospheric data to determine a quality of the atmospheric data and processing the concentration data for pollutant emissions to determine a concentration data quality. The method may also comprise producing a combined quality metric from the processed atmospheric data and the processed concentration data and determining if the combined quality metric is of a high or low level.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

To facilitate understanding, identical reference numerals have been used, where possible, to designate identical elements that are common to the figures ("FIGs"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Aspects of the disclosure relate to methods and algorithms for automated determination of the quality of the data records acquired by sensors monitoring potential airborne pollutant emission events. As with all measurements, the quality of the acquired data will not be consistent. Quite generally, all data should be weighted accordingly with the amount of useful information it provides for further interpretation relative to the amount of noise or potential confounders. In the context of airborne pollutant monitoring, the assessment of the data quality or information content relies on two main factors. First, the atmospheric conditions must be suitable to ensure the validity of the theoretical dispersion models for the given pollutant within the boundary layer. Second, the pollutant concentration measurement itself must be unambiguous and steady to make it interpretable within the said models. While there is broad qualitative understanding in the atmospheric sciences community about what constitutes good versus bad conditions for pollutant source term estimation (STE), aspects of the disclosure provide a workflow and detailed steps for record processing and computation of a quantitative metric that automates the data record ranking process as illustrated in the FIG. 4.

First, the metric for the quality of the atmospheric conditions is discussed, i.e., how good is the equilibrium underlying the validity of the GPM. Then, the metric for assessing the pollutant concentration measurement quality and the processing intended to maximize the useful information content is discussed. Finally, the workflow is outlined combining these elements into a definitive record quality metric that is used to rank, filter, or assign weights to the records for use in STE.

Atmospheric Record Quality

The atmospheric equilibrium quality is determined by the persistence of the atmospheric conditions over an extended period-of-time that it takes for the surface boundary layer to develop. Shifting gusty winds and evolving atmospheric stability class are indicators that atmospheric equilibrium has not been established. Such unfavorable transitional conditions typically happen in the morning and evening when radiative heating or cooling causes a rapid change in the extent of convective currents and vertical energy mixing. Depending on cloud cover, however, unfavorable conditions can occur throughout the day as well. To ensure proper equilibrium has been established, one must therefore examine the variability of the atmospheric parameters of interest over some time prior to the current measurement and ensure that the variablilty is within an acceptable range. The atmospheric parameters of interest in determination of the equilibrium conditions include but are not limited to: wind speed and direction; vertical wind speed and turbulent intensity; intensity of solar radiation; cloud cover; thermal gradient at different heights above ground and assessment of atmospheric stability class. These must be supplied either from on-site measurements or from a nearby weather station. The quality of this atmospheric data, including the distance from the area of interest and proper sampling rate and averaging, will affect the quality of the computed metric. The data records used for determining the atmospheric record quality may be the raw data provided by the instruments or may already be down-sampled, averaged, calibrated or otherwise preprocessed in accordance with best practices for the given measurement.

The time period over which steady conditions must persist in order for equilibrium to be established is not permanent and must be tuned according to the local environment. Typically, the time period would range from tens of minutes to a few hours. Different averaging periods could be used concurrently with different weights assigned to them to smooth the transitions and tune the performance for a given locale or region or possibly, even the time of year. The variability of the atmospheric parameters of interest can be measured by a wide range of indicators. One such indicator might be the standard deviation from the mean; another might be the variance; another might be the sum of residuals; another might be deviation from the median; another might be the deviation from the mode; another might be the maximum and minimum or width or another property of the distribution of the given parameter and another might be the rate of change of the mean value or of the median or of another significant statistic.

Figure 1:
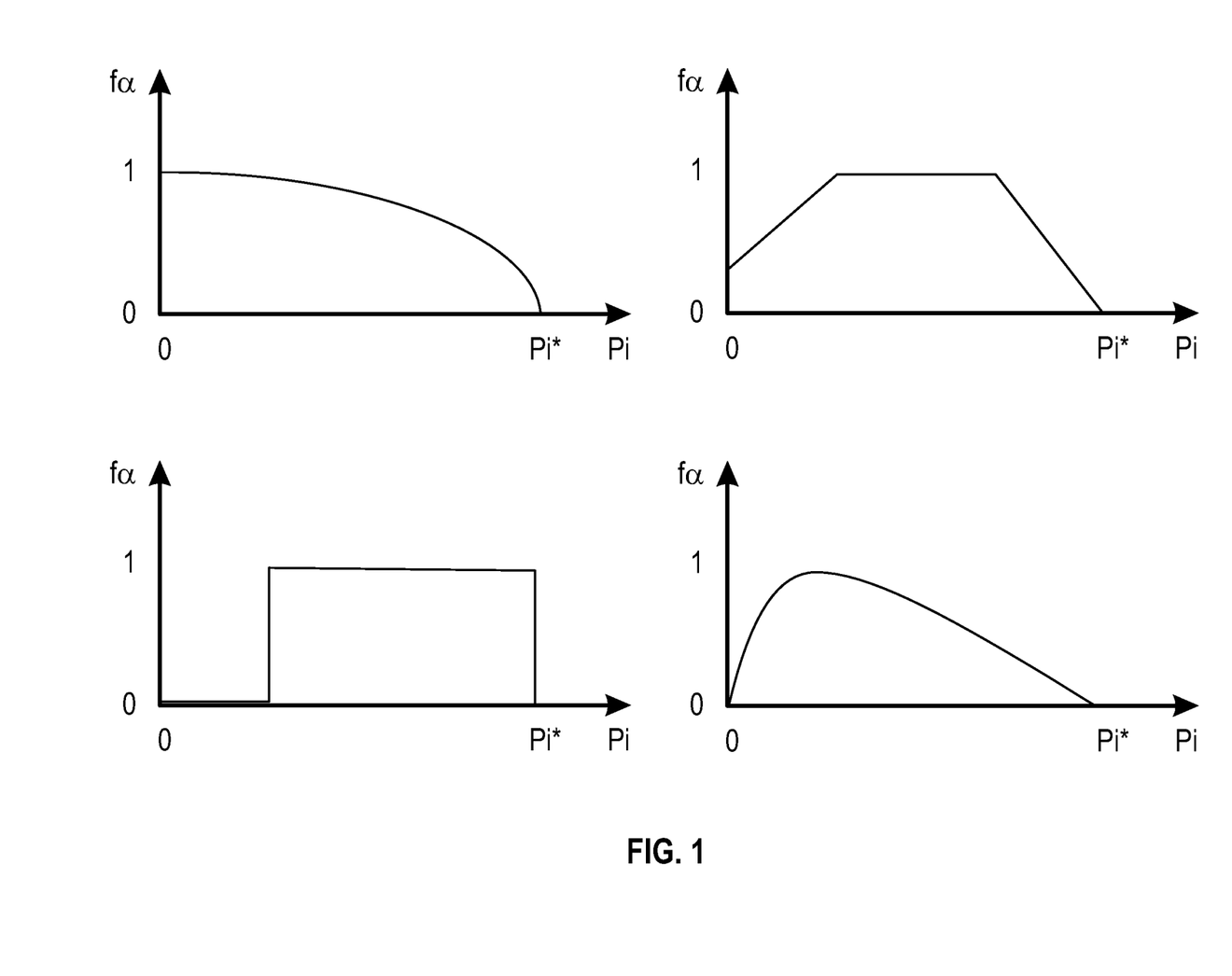
FIG. 1 is a graph of possible implementations of the atmospheric quality functions of one example embodiment of the disclosure.

In one embodiment, once the preferred variability indicators for the various atmospheric parameters of interest over the chosen time-period have been computed, they may be used on their own as the atmospheric record quality metric; or they can be combined with the quality of the current atmospheric conditions in order to yield a more complete metric. The current atmospheric conditions quality can be assessed based on the actual values of the atmospheric parameters of interest rather than their variability over a period-of-time. In general, the final quality metric Q will be a function of both the current values of the selected atmospheric parameters, $p_1, p_2, p_3, \ldots$, as well as their respective variability over the previous period, defined, $S_{p1}, S_{p2}, S_{p3}, \ldots$, with $Q=Q(p_1, p_2, p_3, \ldots, S_{p1}, S_{p2}, S_{p3}, \ldots)$. This function Q can be defined in many ways that capture the overall tendencies of dependence on all the variables. Namely, the function should approach the maximum quality value, for example normalized to 1, 10 or 100, when all the variables approach the ideal atmospheric conditions scenario; and should approach the minimum quality value, for example 0, when the variables indicate an atmospheric regime completely unsuitable for retention of useful data. To give a specific extreme example, when the variability of the wind direction over the previous 10 minutes is 180 degrees, then clearly the collected data will not be useful for STE purposes and thus Q should return the minimum value, e.g., Q=0. The function Q may be a step function defined in terms of if-then-else statements with specific thresholds for each parameter or each variability; or it may vary smoothly with an arbitrary dependence capturing the expected trends. Without much loss of generality, in one implementation, the function Q may be represented as separable in each of the variables, written as: $Q=f_1(p_1) f_2(p_2) f_3(p_3) \ldots f_{s1}(S_{p1}) f_{s2}(S_{p2}) f_{s3}(S_{p3})$, where $f_a$ are functions of just one particular atmospheric parameter or its variability. In one implementation each of the functions $f_a$ could be a function with an assigned range between 0 and 1, with 0 corresponding to the lowest atmospheric quality and 1 corresponding to the highest. Consequently, the overall quality metric Q will also be a function within the range between 0 and 1. The shape of each function $f_a$ may be arbitrary, provided the quality metric captures the desired trends and limits. The function may be a step-wise or a continuously varying form. Some example implementations are shown in the figure below, but many other design options can be used and incorporated as needed.

Concentration Measurement Quality

The quality of the actual measurement of the pollutant concentration is related to the atmospheric quality but contains independent information. Poor atmospheric record quality will likely imply poor concentration measurement quality, but good atmospheric record quality does not guarantee good measurement quality. To give a simple example, if the sensor is malfunctioning, even ideal weather conditions will not result in good measurement quality. Similarly, if the sensor placement or wind direction is such that the plume of pollutant misses the sensor, no useful readings will be recorded no matter what the weather conditions. These cases are easily handled by monitoring sensor hardware flags and by comparing any detected signal against background levels and the known sensor detection limit. Such simple checks must be incorporated into any workflow. As for the atmospheric data, the concentration data used in the processing workflows described below may be the raw data provided by the instruments or may be already down-sampled, averaged, calibrated or otherwise preprocessed data in accordance with best practices for the given measurement.

In one example embodiment, aspects of the disclosure include the treatment of the cases when the sensor is operating properly, and it has recorded unambiguous concentration data. In that case there is typically still uncertainty about where the sensor resides relative to the full extent of the plume. Even if the precise emission source location is known and the wind tracked, the plume will meander in a random fashion buoyed by convective updrafts or shifted sideways by any number of small or larger eddies along its trajectory through the surface boundary layer. Even if in the average sense the mean concentration should follow a Gaussian distribution, the true tails of the distribution may be much wider, with non-zero probability of stray instantaneous plumes deviating significantly from the predicted trajectory. Such stray plumes may result in isolated spikes in the concentration measurement that are not representative of the source location and difficult to interpret in the GPM framework. Such isolated intermittent measurement records should be weighted less in the STE algorithm. Note that a data 'spike' of this sort is not due to instrument malfunction but is a real correct measurement of the concentration at the given time and space. It might be identified and tagged in various ways. In one non-limiting example embodiment, the current sensor reading may be compared with the running mean of multiple records over a period-of-time. A high ratio would indicate high probability of a spike, while a low ratio would indicate a persistent reading and a good chance that the full plume is hitting the sensor rather than coincidence of just one stray waft. Many other widely available algorithms for spike detection and outlier identification may be used at this step.

Even persistent non-spikey readings do not tell whether the sensor sits at the center of the plume or near its edges. If the sensor is mobile, it can potentially be moved around till maximum signal is observed to guarantee placement at the plume center. Even that is difficult, however, as the maximum must be found in the average sense and the wind will likely to shift in the course of multiple time-averaged measurements. The best solution is the deployment of multiple sensors that would intercept that plume across its entire extent; this approach, however, is costly and not suitable for many routine applications. If only one stationary sensor is present, it is not possible to know for sure the location of the sensor relative to plume center. However, with suitable processing, one can optimize the amount information extracted from the data following the workflow outlined below regarding FIG. 4. First, all the valid records must be binned based on wind direction. Depending on the number of records available, the width of the bin can be adjusted to ensure sufficient number of records within each bin while maintaining high resolution in wind direction relative to the typical plume angular spread which might be 10-20 degrees. There is likely to be significant scatter in the concentration values within each bin, even if the emission location and rate remain the same and even if the record atmospheric quality is high. An example of data from a field test is plotted in FIG. 2.

Even for similar wind direction and constant emission rate, the measured concentration varies significantly. One potential cause of this scatter is vertical meander which is difficult to measure accurately. A schematic explanation of this effect is given in FIG. 3. If the height of the release relative to sensor height is not known, and also unknown are other initial conditions that determine the plume momentum and buoyant rise, it is difficult to know precisely the trajectory of the plume center, especially if the sensor is placed near the emission source. Furthermore, convective currents with typical periods of 10's of minutes will move the plume up and down relative to the sensor, resulting in the situation schematically depicted in FIG. 3, that contributes to the scatter observed in FIG. 2. Within each wind-direction bin, as the plume center vertically approaches the sensor location, the signal increases and as it is lofted away by convective currents, the signal decreases. Thus, the maximum reading within each bin is the reading corresponding to the sensor being vertically closest to the plume center. If that reading is assumed to lie at the plume center, it will set the lower bound on the emission rate. Using all the records within each bin for STE will result in an artificially lowered emission rate estimate due to this effect.

Figure 2:
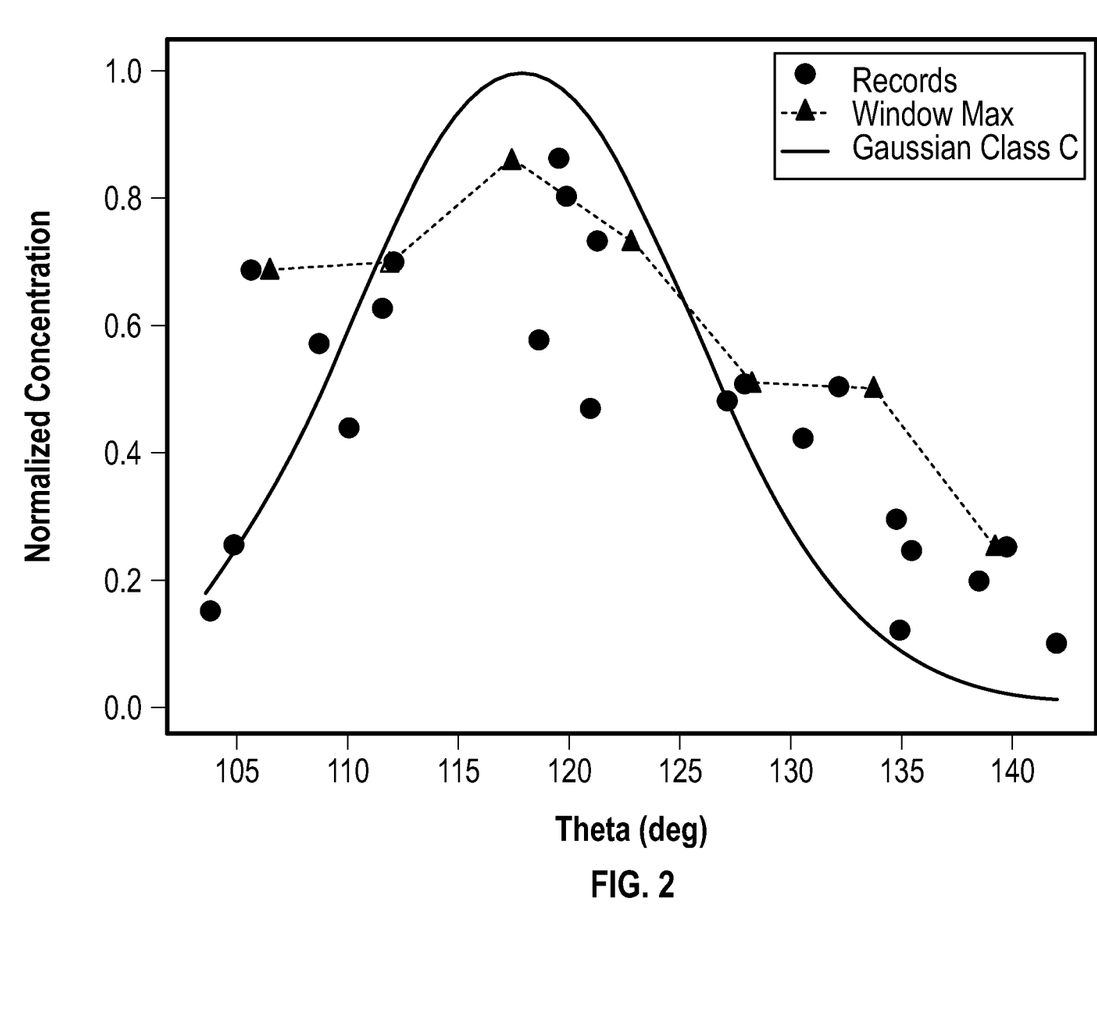
FIG. 2 is a graph of example data with high atmospheric record quality from a field test for one example embodiment of the disclosure.
Figure 3:
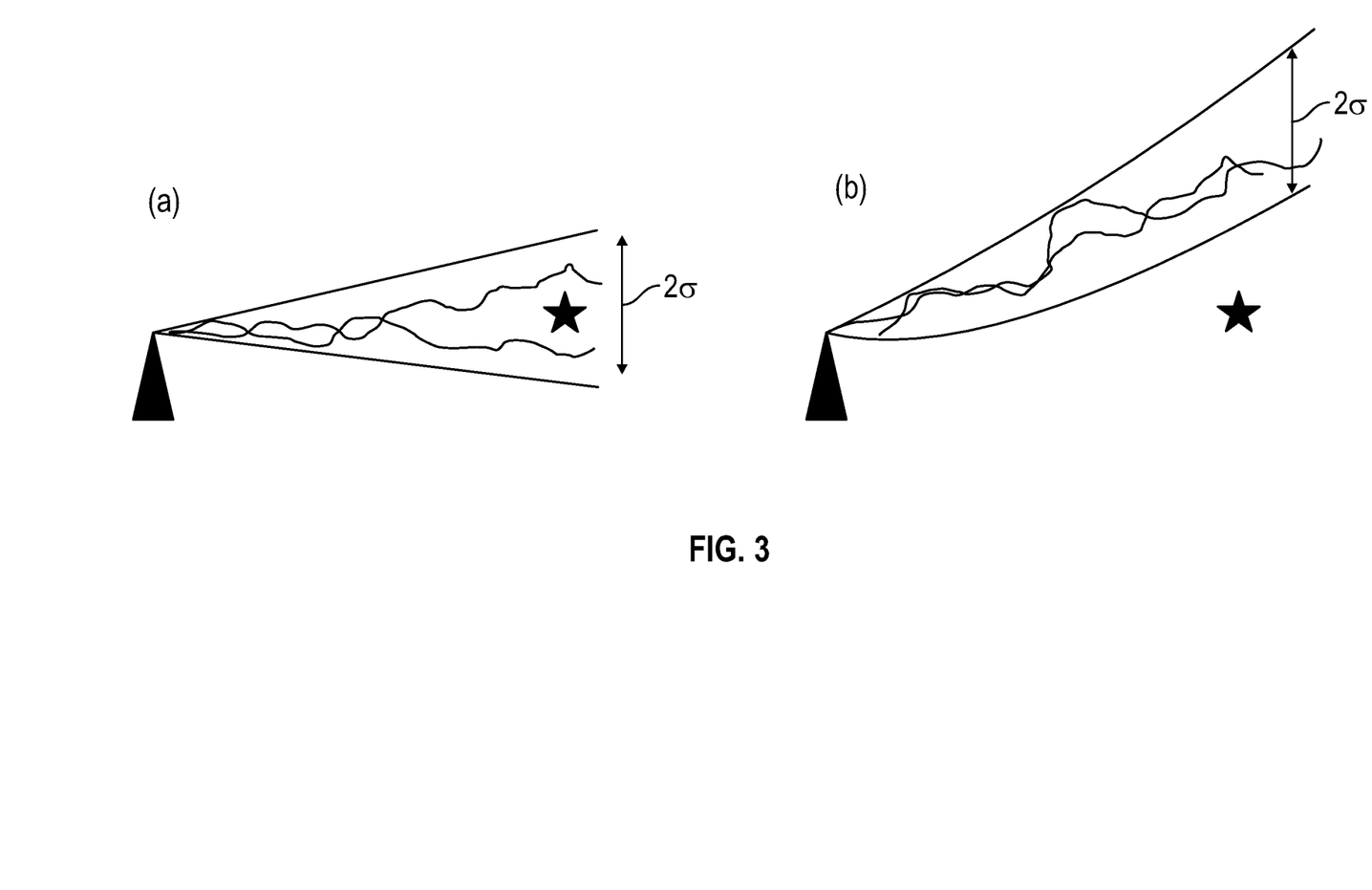
FIG. 3 is a graph showing a schematic effect of vertical plume meander for the same wind direction, same source location and emission rate for one example embodiment of the disclosure.

Next, the optimal treatment of the lateral meander reflected in the angular distribution with respect to the wind direction is discussed as shown in FIG. 2. As for the vertical meander, the measured signal will be the strongest when the sensor is directly at the center of the lateral extent of the plume and will fall off as the sensor is close to the edge of the plume. The main difference is that in the case of lateral plume evolution, the measurement of wind direction is known and thus can predict the effect of shifting wind direction, as shown in FIG. 2.

In one example embodiment, the extension of the principle of optimal filtering and its application to the case of meandering plume detection by a stationary point sensor is different than conventional analysis. If the measured concentration scatter caused by uncontrolled wind fluctuations are considered to be noise, then measurements for wind directions when the sensor is near the plume center have the highest effective signal-to-noise ratio (SNR); while the measurements when the sensor is near the plume edge, have the lowest effective SNR. FIG. 2 shows the GPM prediction for the records plotted. Clearly, the same amount of concentration value scatter near the edges of the GPM distribution will have a much greater impact on the STE results than near the distribution peak. In the example shown, the GPM would need to assume very high emission rates to yield the elevated values near the distribution edge. The simplest way to correct for this bias and optimize the information content of the data is to weight the records according to their SNR. This can be implemented in a number of methods. In one implementation, the mean and standard deviation of all the records in each wind-direction bin can be computed and the ratio used as proxy for SNR and thus the weight for that bin. In another, the standard deviation can be computed for each bin with valid detection and averaged so that the same value is used for each wind-direction bin with the bin's mean value. This is analogous to keeping a single "noise" value across all bins. The signal content for each wind-direction bin can also be computed in a variety of ways. The mean for each bin can be used, or the median, or the maximum as discussed above. Another implementation would fit a Gaussian distribution to the data of concentration versus wind direction angle, where the width can be left as a fitting parameter or can be specified according to the GPM using the sigma appropriate for the given atmospheric stability class or a related value. The fitted Gaussian function would give the most likely direction of the emission source-to-sensor line and can be used as the weighting function for all the records during the STE process based on their wind-direction bin.

Combined Scheme for Record Ranking and Weighting

Once both the atmospheric record quality and concentration measurement quality metrics are assessed, they can be used independently or jointly to rank all records for their usability and serve as a filters or weights during the STE process. One implementation might pre-filter the records based on their atmospheric quality and use only ones above a certain threshold in further processing. The threshold may be adjusted based on the availability of records of different atmospheric qualities. Alternatively, all the records may pass on to the next filtering stage but with weights assigned based on their atmospheric quality metric. At the next step, the records may be filtered or assigned a weight based on whether the data reading can be considered a spike or a result of a rare wind fluctuation. Next, any records that have not been filtered or that have non-zero weights can be binned based on their wind-direction and processed further, assigning additional weighting factors as described in the section on concentration measurement quality. The final record weights or ranking can be compounded based on the weights or ranking assigned at each processing step. Based on the final number of high-rank records available for use in the STE process, the filters or thresholds in the various steps may be adjusted to ensure selection of a sufficient number of records for robust inversion.

Bandwidth and Power Consumption Optimization Using Adaptive Averaging

In the actual implementation of the continuous monitor, each sensor is connected using a wireless protocol (LoraWAN) to a gateway that is responsible for communication of the data to the cloud utilizing cellular networks, satellite links, or other connections. In order to minimize power consumption, maximize data range, and allow for a multiple of sensors on one gateway, the protocol that is used has a very limited bandwidth to send data. This requires each sensor to aggregate data over a time window and then send statistical averages (or medians, etc.) to the gateway. Currently we utilize a fixed time window on the scale of minutes for simplicity. This is, however, not optimal because there could be periods of stable conditions joined with unstable, spike-like data in the same window and it also results in continuous communications each of which requires a significant amount of power that will reduce the battery powered lifetime of a device. By instead using the techniques described above to keep aggregating data if there are no significant changes and then sending an update only once a stable period ends, both bandwidth and power consumption can be significantly reduced.

In order to actually implement this technique, each sensor requires access to meteorological data or an aggregated quality flag. This could be done by installing anemometers and other meteorological measurements on each individual sensor or by utilizing one sensor that can broadcast information indicating that a new averaging period has started.

Figure 4:
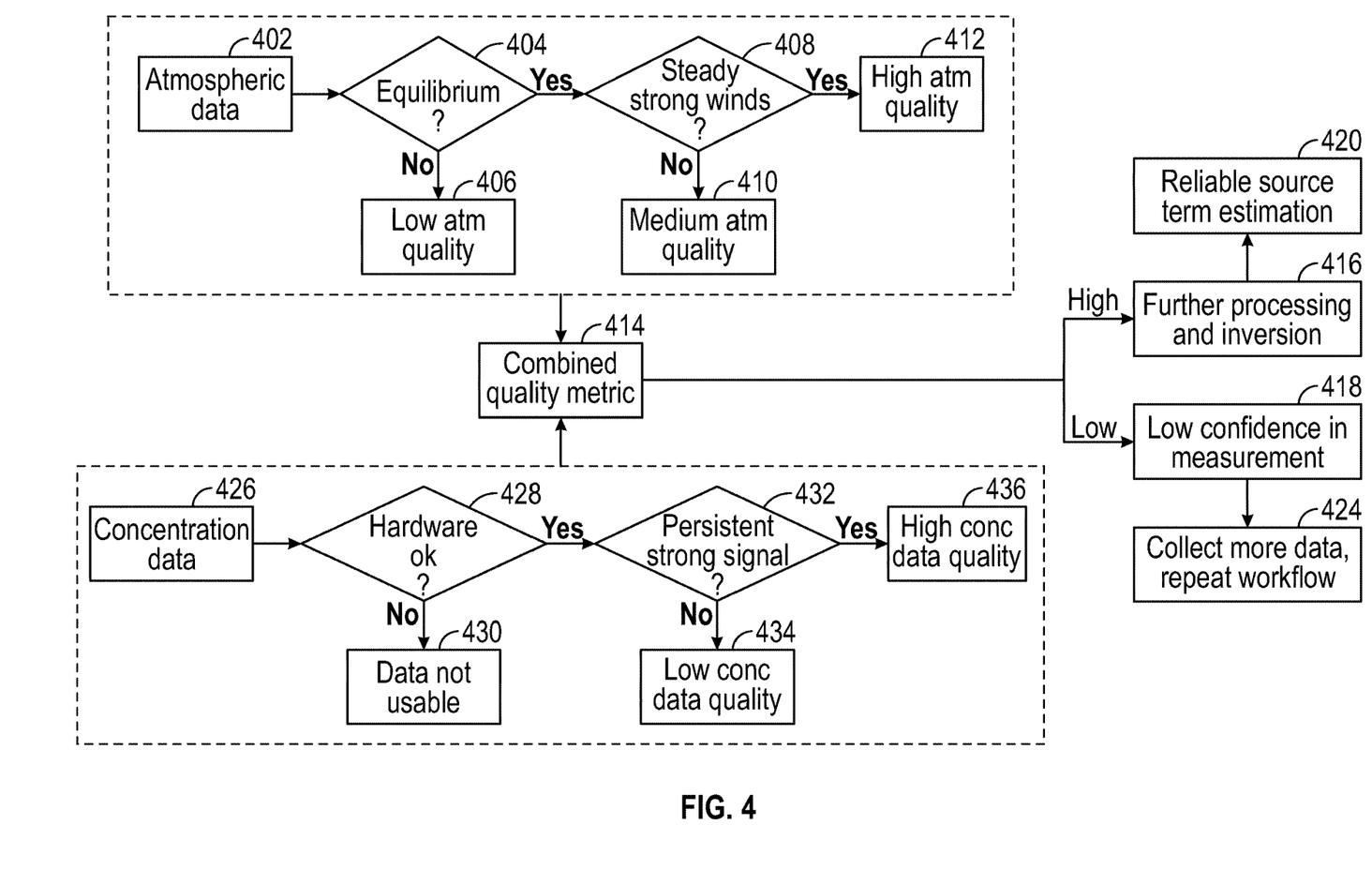
FIG. 4 is a method of workflow of one example embodiment of the disclosure.

Referring to FIG. 4, an example method related to the technologies recited above is illustrated. At 402, atmospheric data is obtained. At 404, equilibrium is checked. If there is no equilibrium, the method progresses to 406 where the user is notified of lower atmospheric quality. The method may stop at that point, or the method may loop back to 402 to obtain further data. If equilibrium is established, then method progresses to 408 where a check for steady strong winds occurs. If steady and strong winds are not indicated, then a notification is made to the user that the data is of medium atmospheric quality at 410.

If strong steady winds are identified at 408, then the method proceeds to 412 with an indication that high atmospheric quality data is present. The data from the evaluation of steps 402 to 412 are fed into a combined quality metric at 414.

The method may also include, at 426 obtaining concentration data. The method progresses to a check on if the hardware is satisfactory at 428. If the check at 428 is not satisfactory, then the user is notified that the data is not usable at 430. If the check at 428 is satisfactory, a check, at 432 of the concentration data is performed if the signal is persistent and strong. If the check at 432 is not satisfactory, then user is notified that there is low concentration data quality at 434. If the signal is strong and persistent at 432, then the method progresses that the user is notified that the concentration data is of high quality at 436. The data from the evaluation steps of 426 to 436 are fed to the combined quality metric at 414.

At 414, if the combined quality metric is high, then further processing and inversion may occur at 416 with a reliable source term estimation at 420. At 414, if the combined quality metric is low in confidence in measurement at 418, then more data may be collected and the workflow repeated at 424.

Aspects of the disclosure provide a method for evaluation of record quality determination that is more consistent than current conventional methods.

Aspects of the disclosure provide for methods that do not have the drawbacks discussed above, namely arbitrary and inaccurate determination.

Aspects of the disclosure provide for a way to reduce economic costs associated with evaluation operations described above while providing a consistent evaluative process.

In one example embodiment, a method for automated record quality determination for pollutant emissions is disclosed. The method may comprise collecting atmospheric data for an area and collecting concentration data for pollutant emissions. The method may also comprise processing the atmospheric data to determine a quality of the atmospheric data and processing the concentration data for pollutant emissions to determine a concentration data quality. The method may also comprise producing a combined quality metric from the processed atmospheric data and the processed concentration data and determining if the combined quality metric is of a high or low level.

In one example embodiment, the method for automated record quality determination for pollutant emissions may be accomplished wherein the processing of the atmospheric data to determine the quality of the atmospheric data determines a low atmospheric quality.

In one example embodiment, the method for automated record quality determination for pollutant emissions may be accomplished wherein the processing of the atmospheric data to determine the quality of the atmospheric data determines a medium atmospheric quality.

In one example embodiment, the method for automated record quality determination for pollutant emissions may be accomplished wherein the processing of the atmospheric data to determine the quality of the atmospheric data determines a high atmospheric quality.

In one example embodiment, the method for automated record quality determination for pollutant emissions may be accomplished wherein the concentration data is of a low quality.

In one example embodiment, the method for automated record quality determination for pollutant emissions may be accomplished wherein the concentration data is of a high quality.

In one example embodiment, the method for automated record quality determination for pollutant emissions may be accomplished wherein when the combined quality metric is of a high level, performing further processing of the combined quality metric.

In one example embodiment, the method for automated record quality determination for pollutant emissions may further comprise performing an inversion of data.

In one example embodiment, the method for automated record quality determination for pollutant emissions may further comprise producing a notification that a reliable source term estimation is occurred.

In one example embodiment, the method for automated record quality determination for pollutant emissions may further comprise when the combined quality metric is of a low level producing a notification that a low confidence measurement has been made.

In one example embodiment, the method for automated record quality determination for pollutant emissions may further comprise collecting another set of atmospheric data and concentration data and performing the method again.

In one example embodiment, the method for automated record quality determination for pollutant emissions may further comprise transmitting all data related to the method to a wireless system.

In one example embodiment, the method for automated record quality determination for pollutant emissions may be performed wherein the wireless system is one of a cellular network and satellite link.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method for automated record quality determination for pollutant emissions, comprising:
   collecting atmospheric data for an area via an anemometer of a sensor assembly placed at a location downwind from an emissions site;
   collecting concentration data for pollutant emissions via an airborne pollutant sensor of the sensor assembly at the location;
   processing the atmospheric data to determine a quality of the atmospheric data based on a wind direction detected by the anemometer at the location;
   processing the concentration data for pollutant emissions to determine a quality of the concentration data;
   producing a combined quality metric from the quality of the atmospheric data and the quality of the concentration data;
   determining if the combined quality metric is of a high level or a low level;
   determining the combined quality metric changes from the high level to the low level based on the wind direction, wherein an end of a stable period is defined by the change in the combined quality metric; and
   reducing a power consumption and increasing a bandwidth of the method by transmitting, after the end of the stable period, a statistical average of the concentration data for pollutant emissions during the stable period.

2. The method for automated record quality determination for pollutant emissions according to claim 1, wherein the processing of the atmospheric data to determine the quality of the atmospheric data determines a low atmospheric quality.

3. The method for automated record quality determination for pollutant emissions according to claim 1, wherein the processing of the atmospheric data to determine the quality of the atmospheric data determines a medium atmospheric quality.

4. The method for automated record quality determination for pollutant emissions, according to claim 1, wherein the processing of the atmospheric data to determine the quality of the atmospheric data determines a high atmospheric quality.

5. The method for automated record quality determination for pollutant emissions according to claim 1, wherein the quality of the concentration data comprises a low quality.

6. The method for automated record quality determination for pollutant emissions according to claim 1, wherein the quality of the concentration data comprises a high quality.

7. The method for automated record quality determination for pollutant emissions according to claim 1, further comprising performing further processing of the combined quality metric based on the combined quality metric being of a high level.

8. The method for automated record quality determination for pollutant emissions according to claim 7, further comprising performing an inversion of the concentration data for pollutant emissions.

9. The method for automated record quality determination for pollutant emissions according to claim 8, further comprising producing a notification that a reliable source term estimation has occurred.

10. The method for automated record quality determination for pollutant emissions according to claim 8, further comprising:
    based on the combined quality metric being of a low level, producing a notification that a low confidence measurement has been made.

11. The method for automated record quality determination for pollutant emissions according to claim 10, wherein:
    the atmospheric data is a first set of atmospheric data;
    the concentration data is a first set of concentration data; and
    the method further comprises:
      collecting a second set of atmospheric data;
      collecting a second set of concentration data; and
      performing the method again using the second set of atmospheric data and the second set of concentration data.

12. The method for automated record quality determination for pollutant emissions according to claim 11, wherein transmitting the statistical average of the concentration data for pollutant emissions comprises:
    transmitting the statistical average of the concentration data for pollutant emissions to a wireless system.

13. The method for automated record quality determination for pollutant emissions according to claim 12, wherein the wireless system comprises at least one of a cellular network or a satellite link.

* * * * *